United States Patent
So

(10) Patent No.: US 8,175,832 B2
(45) Date of Patent: May 8, 2012

(54) AUTOMATIC SENSOR-CALIBRATION METHOD

(75) Inventor: Young Soo So, Anyang-si (KR)

(73) Assignee: Nautilus Hyosung, Seoul (KR)

( * ) Notice: Subject to any disclaimer, the term of this patent is extended or adjusted under 35 U.S.C. 154(b) by 606 days.

(21) Appl. No.: 12/340,425

(22) Filed: Dec. 19, 2008

(65) Prior Publication Data

US 2009/0319215 A1 Dec. 24, 2009

(30) Foreign Application Priority Data

Dec. 21, 2007 (KR) .................. 10-2007-0135511
Dec. 24, 2007 (KR) .................. 10-2007-0136215
Dec. 24, 2007 (KR) .................. 10-2007-0136217

(51) Int. Cl.
*G01D 18/00* (2006.01)
*G06Q 40/00* (2006.01)

(52) U.S. Cl. .................. 702/85; 235/379; 705/43

(58) Field of Classification Search ............ 702/85, 702/57–58, 64–65, 68–69, 81, 84, 104, 127, 702/179, 182–185, 189, 193; 235/379–382, 235/435–437, 454–455; 324/96–97, 500–501, 324/522, 525, 601; 705/43; 902/8
See application file for complete search history.

(56) References Cited

U.S. PATENT DOCUMENTS 7,040,534 B2 * 5/2006 Turocy et al. .............. 235/379
* cited by examiner

*Primary Examiner* — Michael Nghiem
*Assistant Examiner* — Toan M Le
(74) *Attorney, Agent, or Firm* — Christensen O'Connor Johnson Kindness PLLC

(57) ABSTRACT

Provided is an automatic sensor-calibration method in which a state change of a sensor, caused by aging characteristics or contamination of the sensor, is sensed by a sensor input unit to adjust, according to the sensed state change of the sensor, a slice level used as a criterion for a light receiving device to determine whether a medium exists, or the slice level is adjusted according to the sensed state change of the sensor and a current level of a light emitting device is adjusted when the slice level reaches a preset absolute slice level, or when contamination of the sensor is removed, the current level of the light emitting device is reduced to a minimum step, the slice level is set, and then the current level of the light emitting device is adjusted based on the set slice level, thereby preventing malfunction of the sensor.

11 Claims, 8 Drawing Sheets

[FIG. 1]
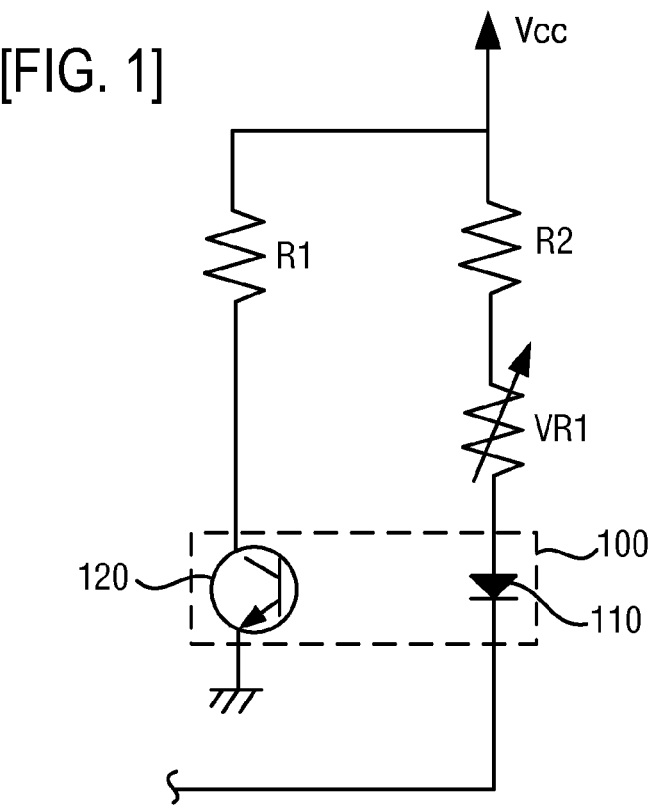
[FIG. 2]
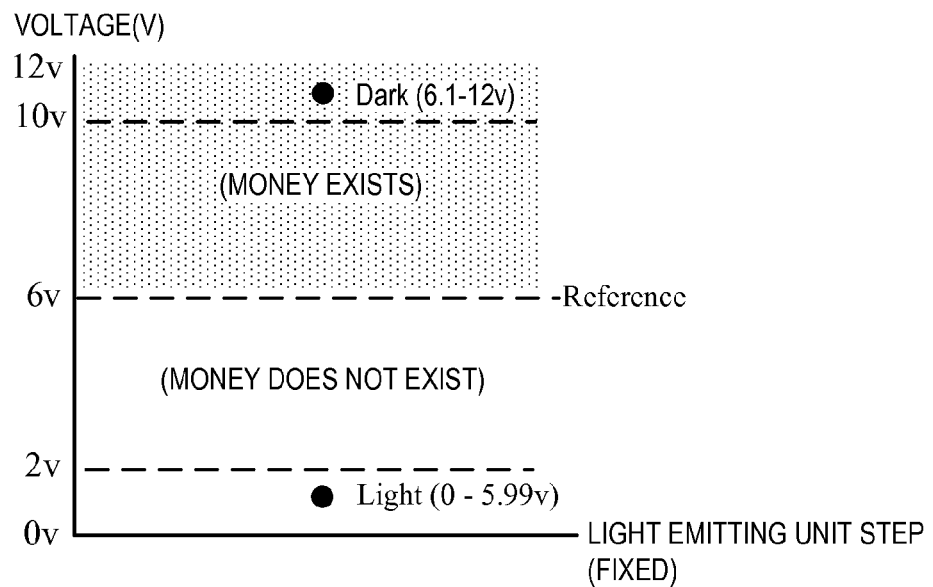

[FIG. 3]
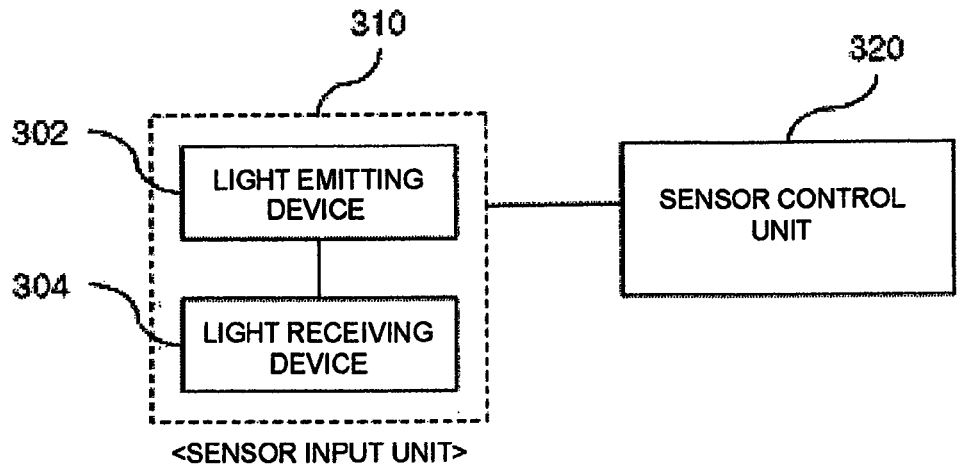
[FIG. 4]
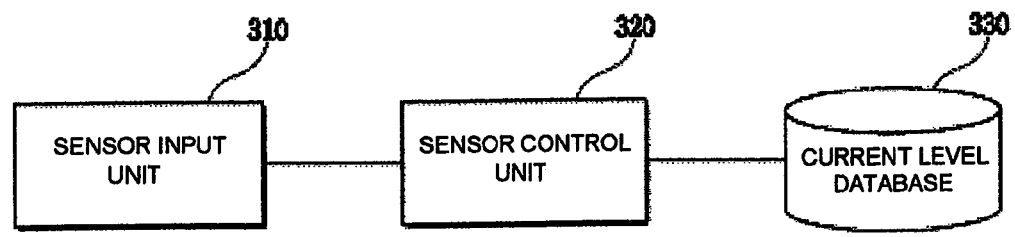
[FIG. 5]
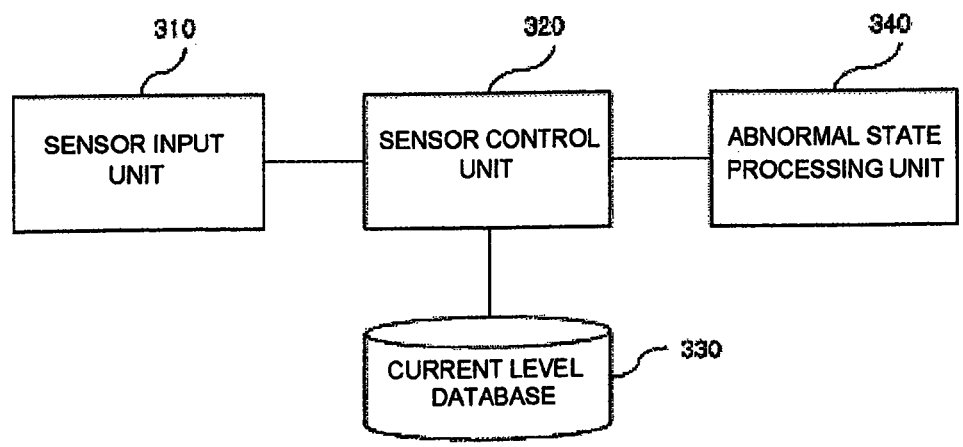

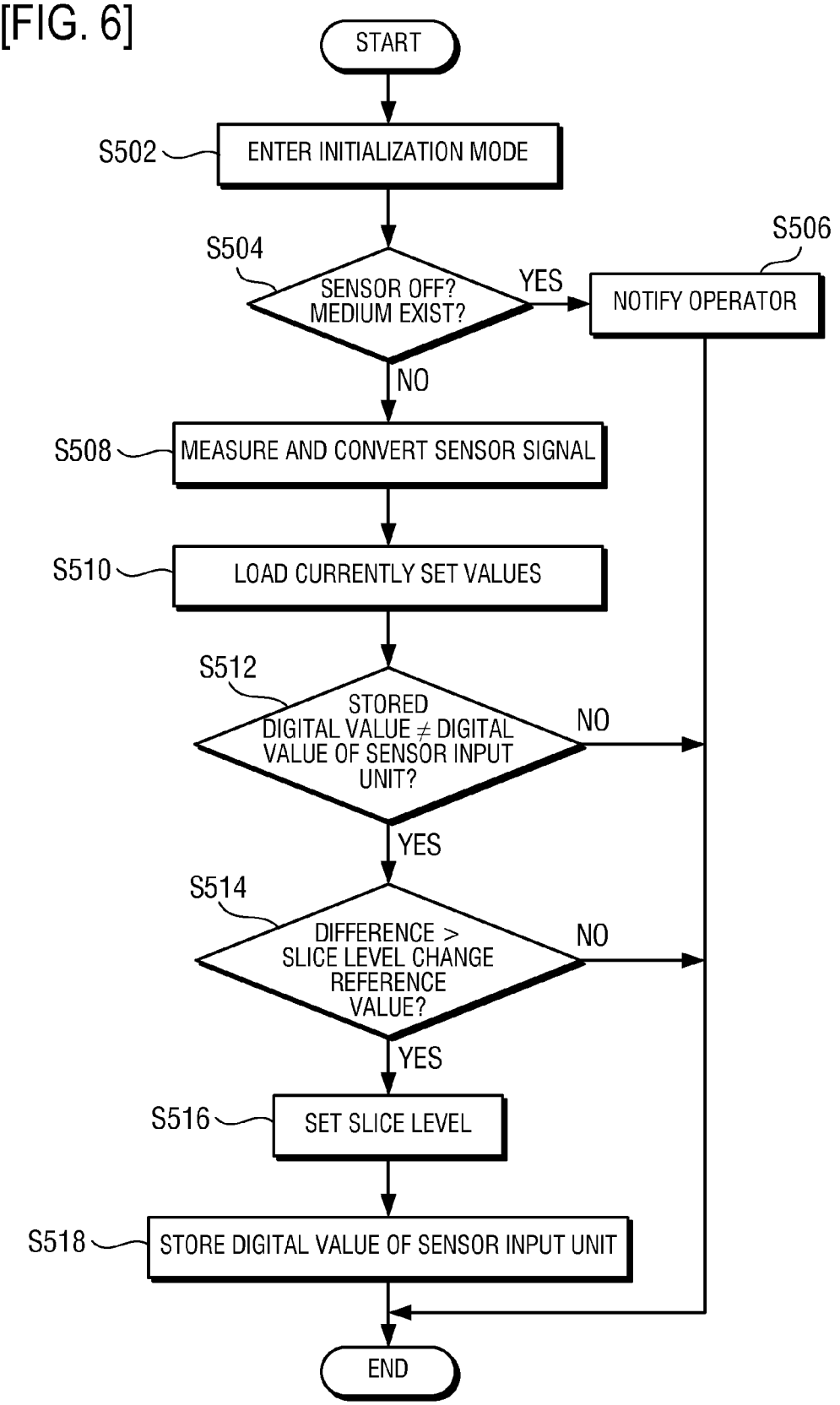

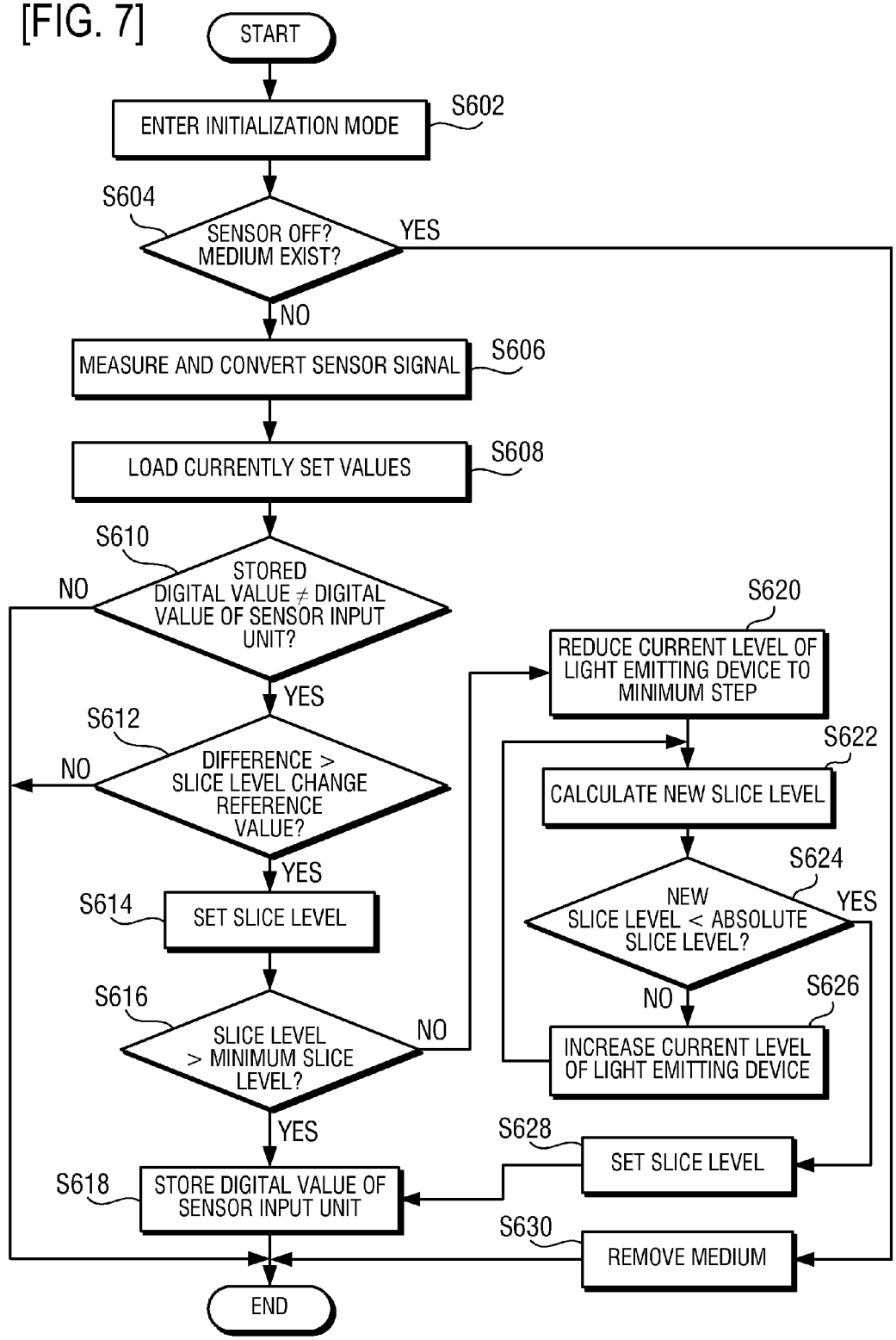

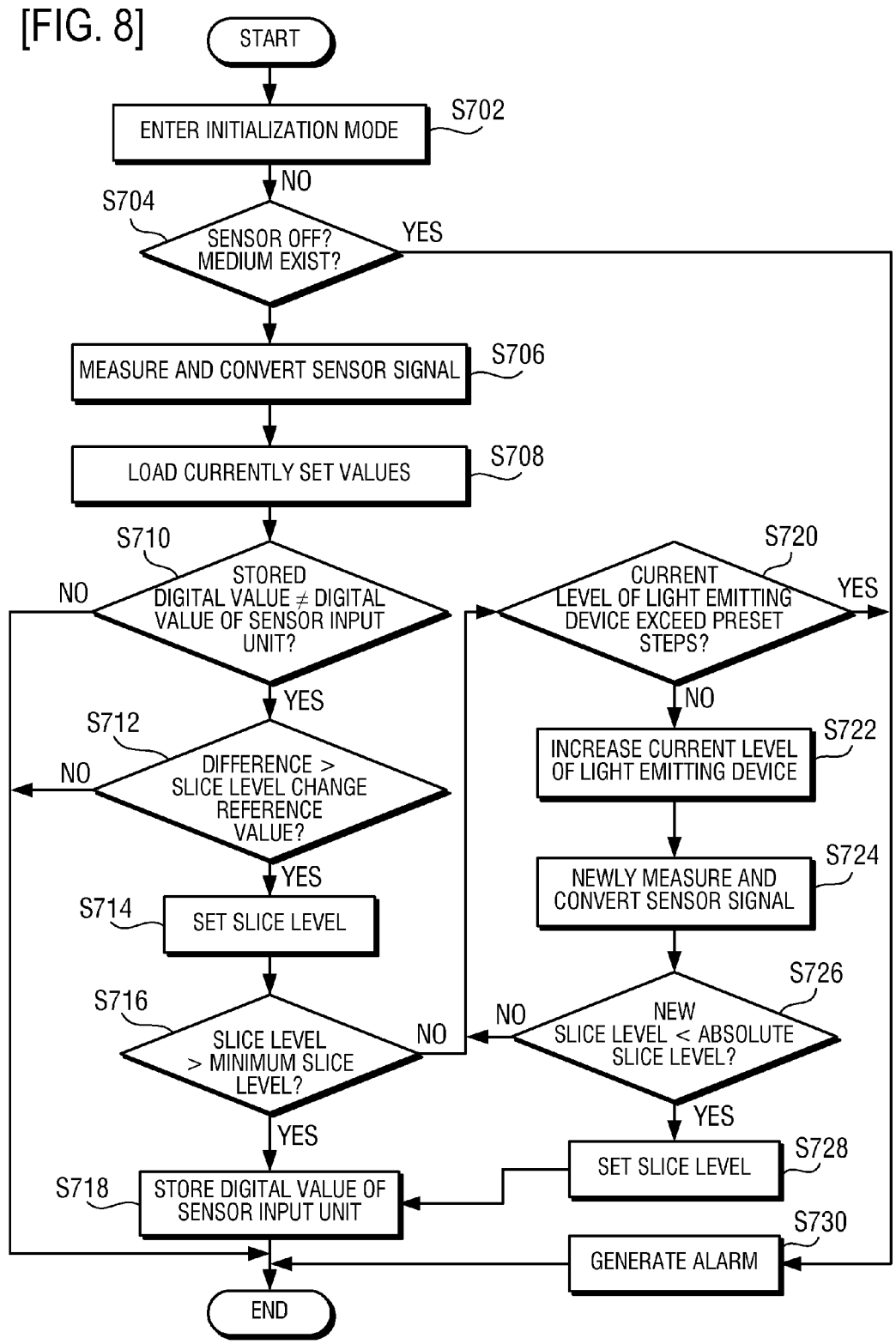

[FIG.9]
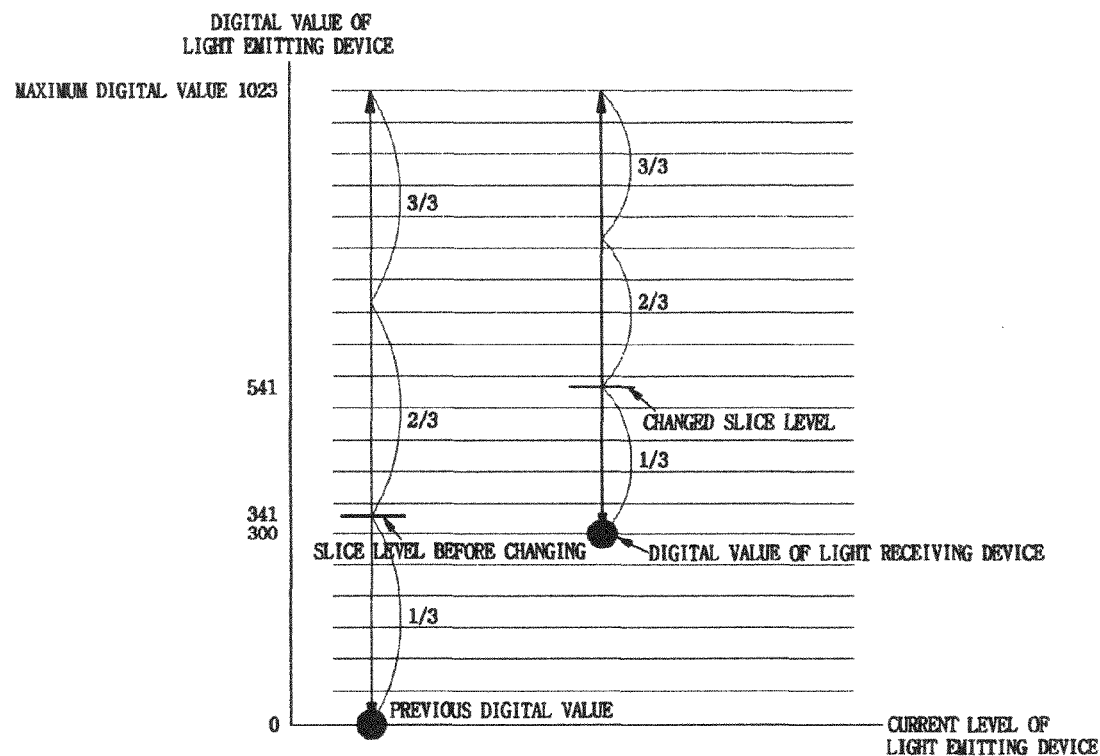

[FIG.10]
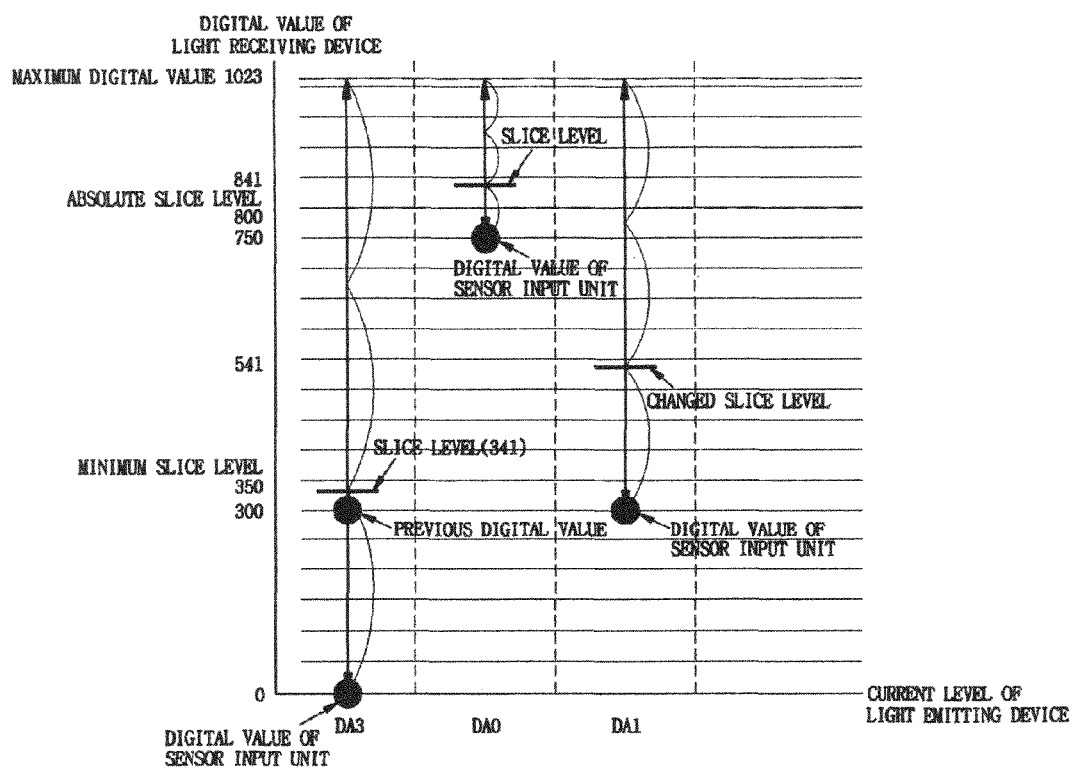

[FIG.11]
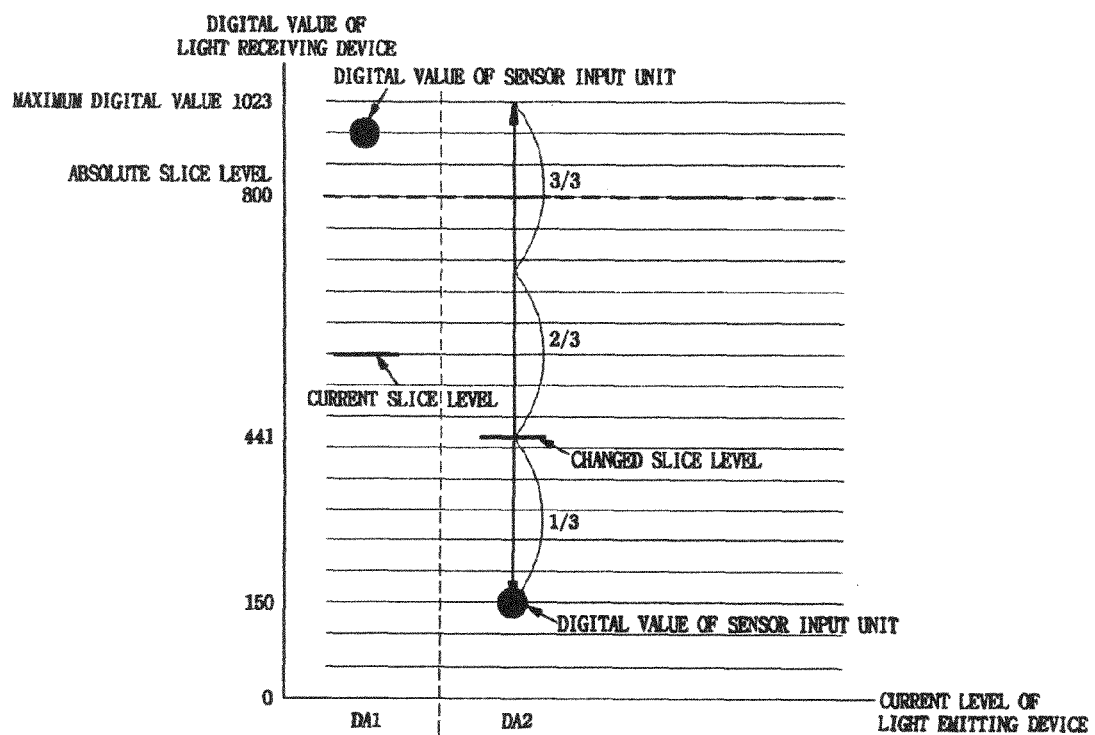

AUTOMATIC SENSOR-CALIBRATION METHOD

CROSS-REFERENCE TO RELATED PATENT APPLICATION

This application claims the benefit of Korean Patent Application No. 10-2007-135511, 10-2007-136215 and 10-2007-136217, filed on Dec. 21, 2007, Dec. 24, 2007 and Dec. 24, 2007, respectively in the Korean Intellectual Property Office, the disclosure of which is incorporated herein in its entirety by reference.

BACKGROUND OF THE INVENTION

1. Field of the Invention

The present invention generally relates to an automatic sensor-calibration method, and more particularly, to an automatic sensor-calibration method in which a state change of a sensor, caused by aging characteristics or contamination of the sensor, is sensed by a sensor input unit to adjust, according to the sensed state change of the sensor, a slice level used as a criterion for a light receiving device to determine whether a medium exists, or the slice level is adjusted according to the sensed state change of the sensor and a current level of a light emitting device is adjusted when the slice level reaches a preset absolute slice level, or when contamination of the sensor is removed, the current level of the light emitting device is reduced to a minimum step, the slice level is reset, and then the current level of the light emitting device is adjusted again based on the reset slice level, thereby preventing malfunction of the sensor.

2. Description of the Related Art

Automated Teller Machines (ATMs) are automated devices capable of providing basic financial services such as withdrawal and deposit without bank tellers regardless of time and space. The ATMs are configured such that customers themselves can do transaction such as withdrawal or deposit of cash by using media like cards or bankbooks.

Since most companies have adopted a 5-day workweek, most people use ATMs or Cash Dispensers (CDs) instead of directly going to the bank, expanding installation of ATMs and increasing the number of ATMs installed. At present, ATMs having additional functions as well as main functions are under consideration and new ATMs are being developed to improve competitiveness of banks and to satisfy customers' demands.

The ATM includes numerous sensors by which the ATM can control a flow of money. FIG. 1 illustrates an example of modules of a sensor 100 of an ATM.

As illustrated in FIG. 1, the sensor 100 includes a light emitting device 110, such as a light emitting diode (LED), which generates a light signal with an electric current adjusted by variable resistors, and a light receiving device 120 which receives the generated light signal, in which the electric-current adjustment for the light emitting device 110 is performed by a Digital-to-Analog Converter (DAC). By having the structure as illustrated in FIG. 1, the sensor 100 of the ATM can sense a flow of a medium such as money or a cash card between the light emitting device 110 and the light receiving device 120.

In other words, it is determined that a medium such as money does not exist when the light receiving device 120 senses light of an amount greater than a predetermined amount. When the light receiving device 120 senses light of an amount less than the predetermined amount, it is determined that a medium exists between the light emitting device 110 and the light receiving device 120. FIG. 2 is a graph illustrating a criterion used for a conventional sensor to determine existence of a medium.

As illustrated in FIG. 2, for a slice level of 6V which is used as a criterion to determine existence of a medium, when a voltage of a light emitting device is sensed to be 6.1-12V, it is determined that the medium exists between the light emitting device and a light receiving device. When the voltage of the light emitting device is sensed to be 0-5.99V, it is determined that the medium does not exist between the light emitting device and the light receiving device.

However, the slice level of the sensor is a fixed absolute reference value, causing undesired malfunction of the sensor. For example, when light emitted from the light emitting device is lower than a slice level due to deterioration of the sensor used for a long period of time or due to settlement of dust or foreign substances on the light emitting device, the ATM determines that the sensor senses a medium even if the medium does not actually exist between the light emitting device and the light receiving device, resulting in malfunction of the sensor. Such malfunction of the sensor increases the number of operations of the ATM, degrading the efficiency of the ATM.

To solve those problems, methods for changing a slice level according to a state change of a sensor have been suggested. These methods, however, merely increase the slice level when the sensor is polluted by contaminants. Thus, when the contaminants are removed by an operator or through movement of a medium existing between the light emitting device and the light receiving device, determination of whether the sensor senses the medium is performed based on the increased slice level. As a result, the ATM determines that the sensor senses no medium even if the medium actually exists between the light emitting device and the light receiving device.

SUMMARY OF THE INVENTION

The present invention is intended to solve the foregoing problems. In other words, the present invention provides an automatic sensor-calibration method in which when a brightness of a light emitting device is lower than a reference level, a slice level used as a criterion for a light receiving device to determine whether a medium exists is automatically adjusted and a current level of the light emitting device is increased stepwise in order to prevent malfunction of a sensor, and when contamination of a sensor is removed, the current level of the light emitting device is reduced to a minimum step, the slice level is reset, and then the current level of the light emitting device is adjusted based on the reset slice level in order to prevent malfunction of the sensor.

According to another aspect of the present invention, there is provided an automatic sensor-calibration method for an automatic sensor-calibration apparatus comprising a sensor input unit, a current level database, and a sensor control unit. The automatic sensor-calibration method includes, upon entry to an initialization mode after booting, measuring a sensor signal by a sensor input unit and converting the measured sensor signal into a digital value, loading a stored digital value of a previous sensor signal, a currently set maximum digital value for a sensor signal of a light receiving device, a current level of a light emitting device, a minimum slice level, and an absolute slice level, comparing the loaded digital value of the previous sensor signal with the digital value of the sensor signal measured by the sensor input unit, calculating a new slice level if the loaded digital value of the previous sensor signal is different from the digital value of the sensor signal measured by the sensor input unit, and changing a current slice level to the calculated new slice level, reducing the current level of the light emitting device to a minimum step if the changed slice level is lower than the minimum slice level, and newly measuring a sensor signal by the sensor input unit, converting the measured sensor signal into a digital value, calculating a new slice level based on the digital value of the newly measured sensor signal, comparing the calculated new slice level with the absolute slice level, increasing the current level of the light emitting device until the new slice level calculated based on the digital value of the newly measured sensor signal is lower than the absolute slice level, and changing a current slice level to the new slice level calculated based on the digital value of the newly measured sensor signal when the new slice level is lower than the absolute slice level.

According to another aspect of the present invention, there is provided an automatic sensor-calibration method for an automatic sensor-calibration apparatus comprising a sensor input unit, a current level database, and a sensor control unit. The automatic sensor-calibration method includes, upon entry to an initialization mode after booting, measuring a sensor signal by a sensor input unit and converting the measured sensor signal into a digital value, loading a stored digital value of a previous sensor signal, a currently set maximum digital value for a sensor signal of a light receiving device, a current level of a light emitting device, a minimum slice level, and a maximum slice level, comparing the loaded digital value of the previous sensor signal with the digital value of the sensor signal measured by the sensor input unit, calculating a new slice level if the loaded digital value of the previous sensor signal is different from the digital value of the sensor signal measured by the sensor input unit, and changing a current slice level to the calculated new slice level, reducing the current level of the light emitting device to a minimum step if the changed slice level is lower than the minimum slice level, and newly measuring a sensor signal by the sensor input unit, converting the measured sensor signal into a digital value, calculating a new slice level based on the digital value of the newly measured sensor signal, comparing the calculated new slice level with the maximum slice level, increasing the current level of the light emitting device until the new slice level calculated based on the digital value of the newly measured sensor signal is lower than the maximum slice level, and changing a current slice level to the new slice level calculated based on the digital value of the newly measured sensor signal when the new slice level is lower than the maximum slice level.

According to another aspect of the present invention, there is provided an automatic sensor-calibration method for an automatic sensor-calibration apparatus comprising a sensor input unit, an abnormal state processing unit, a current level database, and a sensor control unit. The automatic sensor-calibration method includes upon entry to an initialization mode after booting, measuring a sensor signal by a sensor input unit and converting the measured sensor signal into a digital value, loading a stored digital value of a previous sensor signal, a currently set maximum digital value for a sensor signal of a light receiving device, a current level of a light emitting device, and an absolute slice level, comparing the loaded digital value of the previous sensor signal with the digital value of the sensor signal measured by the sensor input unit, calculating a new slice level if the loaded digital value of the previous sensor signal is different from the digital value of the sensor signal measured by the sensor input unit, and changing a current slice level to the calculated new slice level, increasing the current level of the light emitting device if the changed slice level reaches the absolute slice level, and newly measuring a sensor signal by the sensor input unit, converting the measured sensor signal into a digital value, calculating a new slice level based on the digital value of the newly measured sensor signal, comparing the calculated new slice level with the absolute slice level, increasing the current level of the light emitting device until the new slice level calculated based on the digital value of the newly measured sensor signal is lower than the absolute slice level, and changing a current slice level to the new slice level calculated based on the digital value of the newly measured sensor signal when the new slice level is lower than the absolute slice level.

BRIEF DESCRIPTION OF THE DRAWINGS

The above and other features and advantages of the present invention will become more apparent by describing in detail embodiments thereof with reference to the attached drawings in which:

FIG. 1 illustrates an example of modules of a sensor of an Automated Teller Machine (ATM);

FIG. 2 is a graph illustrating a criterion used for a conventional sensor to determine existence of a medium;

FIG. 3 is a block diagram of an automatic sensor-calibration apparatus according to a first embodiment of the present invention;

FIG. 4 is a block diagram of an automatic sensor-calibration apparatus according to a second embodiment of the present invention;

FIG. 5 is a block diagram of an automatic sensor-calibration apparatus according to a third embodiment of the present invention;

FIG. 6 is a flowchart illustrating an automatic sensor-calibration method according to the first embodiment of the present invention;

FIG. 7 is a flowchart illustrating an automatic sensor-calibration method according to the second embodiment of the present invention;

FIG. 8 is a flowchart illustrating an automatic sensor-calibration method according to the third embodiment of the present invention;

FIG. 9 is a graph illustrating an example where a slice level is changed according to the first embodiment of the present invention;

FIG. 10 is a graph illustrating an example where a slice level is changed according to the second embodiment of the present invention; and FIG. 11 is a graph illustrating an example where a slice level is changed according to the third embodiment of the present invention.

DETAILED DESCRIPTION OF THE INVENTION

Hereinafter, embodiments of the present invention will be described in detail with reference to the accompanying drawings. However, the following embodiments are provided only for illustrative purposes and in no way limit the scope of the present invention.

First Embodiment

Automatic sensor-calibration method to automatically calibrate slice level used as criterion for light receiving device to determine whether medium exists, when brightness of light emitting device is lower than reference level.

FIG. 3 is a block diagram of an automatic sensor-calibration apparatus according to a first embodiment of the present invention.

Referring to FIG. 3, the automatic sensor-calibration apparatus includes a sensor input unit 310 and a sensor control unit 320.

The sensor input unit 310 includes a sensor having a light emitting device 302, a light receiving device 304, and variable resistors (not shown). The sensor input unit 310 detects a medium such as money. In other words, once the light emitting device 302 emits light, the light receiving device 304 senses the emitted light, converts a current state signal of the sensor into a digital value through an Analog-to-Digital Converter (ADC: not shown), and transmits the digital value to the sensor control unit 320. The ADC may be included in the light receiving device 304 or may be connected to the light receiving device 304 by a separate connection device. The ADC converts a voltage value, which is the current state signal of the sensor sensed by the light receiving device 304, into a digital value ranging between 0 and 255 or between 0 and 1023 according to the resolution of the ADC.

The sensor control unit 320 compares a digital value of a sensor signal measured by the sensor input unit 310 with a stored digital value of a previous sensor signal to reset, according to the comparison result, a slice level used as a criterion for the light receiving device 304 to determine whether a medium exists.

In other words, in an initialization mode of an Automated Teller Machine (ATM), when a digital value of a sensor signal measured by the sensor input unit 310 is different from a stored digital value of a previous sensor signal by a difference that is greater than a preset difference, the sensor control unit 320 changes the slice level. The slice level is used as a criterion to determine whether a medium exists between the light emitting device 302 and the light receiving device 304, and during operation of the ATM, if a digital value of a sensor signal sensed by the light receiving device 304 exceeds the slice level, the sensor determines that a medium exists between the light emitting device 302 and the light receiving device 304.

When the digital value of the sensor signal measured by the sensor input unit 310 is different from the stored digital value of the previous sensor signal, the slice level is calculated as a result of increasing the digital value of the sensor signal measured by the sensor input unit 310 by ⅓ of a difference between the digital value of the sensor signal measured by the sensor input unit 310 and a maximum digital value for a sensor signal of the light receiving device 304. In other words, the slice level is calculated as the digital value of the sensor signal measured by the sensor input unit 310 plus ⅓ of the difference between the digital value of the sensor signal measured by the sensor input unit 310 and the maximum digital value for the sensor signal of the light receiving device 304.

For example, as illustrated in FIG. 9, it is assumed that a maximum digital value for a sensor signal of a light receiving device is 1023, a previous slice level is 341, a stored digital value of a previous sensor signal is 0, a digital value of a sensor signal measured by a sensor input unit is 300, and a slice level is changed when the digital value of the sensor signal measured by the sensor input unit is different from the stored digital value of the previous sensor signal by more than ±10. In this case, the digital value of the sensor signal measured by the sensor input unit is different from the stored digital value of the previous sensor signal by 300. As a result, the slice level is reset to 541 which is a result of increasing the digital value 300 of the sensor signal measured by the sensor input unit by ⅓ of a difference 723 between the maximum digital value 1023 for the sensor signal of the light receiving device and the digital value 300 of the sensor signal measured by the sensor input unit.

FIG. 6 is a flowchart illustrating an automatic sensor-calibration method according to the first embodiment of the present invention.

In operation S502, once power is supplied to a sensor by power supply to an ATM, the sensor enters an initialization mode to perform an automatic sensor-calibration process. In operation S504, the sensor control unit (320 of FIG. 3) determines whether power is supplied to the sensor and whether there is a medium. If any medium such as money remains, the sensor control unit notifies an operator of the existence of the medium in operation S506 such that the operator can remove the remaining medium.

Next, in a state where there is no medium in the sensor, a sensor signal is measured. The sensor signal, being a brightness value measured by the sensor input unit (310 of FIG. 3), is a brightness value sensed by the light receiving device (304 of FIG. 3) from light emitted from the light emitting device (302 of FIG. 3). The brightness value of the light receiving device is generally sensed as a voltage value and the ADC converts the sensed voltage value into a digital value ranging between 0 and 255 or between 0 and 1023 according to its resolution and transmits the digital value to the sensor control unit (320 of FIG. 3) in operation S508.

The sensor control unit also loads, from a memory such as Read Only Memory (ROM), a stored digital value of a previous sensor signal, a currently set maximum digital value of a sensor signal of the light receiving device, and a slice level change reference value in operation S510. The slice level change reference value is a reference value for performing slice level change when a difference between a stored digital value of a previous sensor signal and a digital value of a sensor signal measured by the sensor input unit exceeds the slice level change reference value.

After completion of the loading, the sensor control unit compares the digital value of the sensor signal measured by the sensor input unit with the stored digital value of the previous sensor signal loaded from the memory in operation S512.

As a result of the comparison, if a difference between the digital value of the sensor signal measured by the sensor input unit and the stored digital value of the previous sensor signal is less than the slice level change reference value in operation S514, the current slice level is maintained. On the other hand, if the difference is greater than the slice level change reference value in operation S514, the slice level is reset to a result of increasing the digital value of the sensor signal measured by the sensor input unit by ⅓ of a difference between the digital value of the sensor signal measured by the sensor input unit and a maximum digital value for a sensor signal of the light receiving device in operation S516.

The digital value of the sensor signal measured by the sensor input unit is stored in the memory in operation S518 in order to be compared with a digital signal of a sensor signal newly measured by the sensor input unit when the sensor enters the initialization mode later.

Second Embodiment

Automatic sensor-calibration method to set slice level used as criterion for light receiving device to determine whether medium exists after reducing current level of light emitting device to minimum step and resetting current level of light emitting device according to set slice level, when contamination of sensor is removed, thereby preventing malfunction of sensor.

FIG. 4 is a block diagram of an automatic sensor-calibration apparatus according to a second embodiment of the present invention.

As illustrated in FIG. 4, the automatic sensor-calibration apparatus includes the sensor input unit 310, the sensor control unit 320, and a current level database 330.

The sensor input unit 310 and the sensor control unit 320 according to the current embodiment of the present invention are the same as the sensor input unit 310 and the sensor control unit 320 according to the first embodiment of the present invention.

However, the sensor control unit 320 according to the current embodiment of the present invention has an additional function of increasing or reducing a current level of the light emitting device by using the current level database 330.

When a slice level calculated based on a digital value of a sensor signal measured by the sensor input unit 310 is lower than a preset minimum slice level, the current level of the light emitting device is reduced to a minimum step among electric-current steps being set in the current level database 330.

After the current level of the light emitting device is reduced to the minimum step, a sensor signal is newly measured according to the reduced current level and is then converted into a digital value. Thereafter, a slice level is calculated based on the digital signal of the sensor signal newly measured by the sensor input unit 310.

Next, the slice level calculated based on the digital signal of the sensor signal newly measured by the sensor input unit 310 is compared with an absolute slice level, such that the current level of the light emitting device is increased stepwise until the calculated slice level is lower than the absolute slice level.

During the process of stepwise increasing the current level of the light emitting device, when the calculated slice level is lower than the absolute slice level, the current slice level is changed to the calculated slice level. The digital value of the sensor signal newly measured by the sensor input unit 310 is stored in a memory in order to be compared with a new digital value of a sensor signal newly measured by the sensor input unit 310 when the sensor enters the initialization mode later.

For example, as illustrated in FIG. 10, when the current level of the light emitting device is a third step DA2, a maximum digital value for a sensor signal of the light receiving device is 1023, a minimum slice level is 350, an absolute slice level is 800, a stored digital value of a previous sensor signal is 300, and a digital value of a sensor signal measured by the sensor input unit is 0, the slice level may be set to 341. However, since the minimum slice level is 350, the current level of the light emitting device is reduced to a minimum step, i.e., a first step DA0.

When a slice level calculated based on a digital value of a sensor signal newly measured by the sensor input unit according to the changed current level of the light emitting device is 841, it is greater than the absolute slice level. For this reason, the current level of the light emitting device is reset to a second step DA1 by being increased by one step and the slice level is calculated again based on a digital value of the sensor signal newly measured by the sensor input unit according to the reset current level of the light emitting device.

When the slice level calculated again based on the digital value of the sensor signal newly measured by the sensor input unit according to the reset current level of the light emitting device is 541, it is lower than the absolute slice level and thus the current slice level is changed to the slice level calculated again based on the digital value of the sensor signal newly measured by the sensor input unit according to the reset current level of the light emitting device. The digital value of the sensor signal newly measured by the sensor input unit according to the reset current level of the light emitting device is stored in a memory in order to be compared with a new digital value of a sensor signal newly measured by the sensor input unit 310 when the sensor enters the initialization mode later.

The current level database 330 stores a current value of the light emitting device per step, such that when a slice level calculated based on a digital value of a sensor signal measured by the sensor input unit 310 is higher than a preset absolute slice level, the current level of the light emitting device can be increased to the next higher step. According to the current embodiment of the present invention, there are a total of 16 steps as below.

TABLE 1

| DA step | Current (mA) | Current difference (mA) |
|---|---|---|
| DA0 | 8.8 | — |
| DA1 | 11.6 | 2.8 |
| DA2 | 13.4 | 1.8 |
| DA3 | 18.0 | 4.6 |
| DA4 | 22.6 | 4.6 |
| DA5 | 31.4 | 8.8 |
| DA6 | 40.4 | 9.0 |
| DA7 | 49.4 | 9.0 |
| DA8 | 58.0 | 8.6 |
| DA9 | 67.6 | 9.6 |
| DA10 | 76.4 | 8.8 |
| DA11 | 84.8 | 8.4 |
| DA12 | 93.6 | 8.8 |
| DA13 | 102.4 | 8.8 |
| DA14 | 120.4 | 18.0 |
| DA15 | 138.8 | 18.4 |

FIG. 7 is a flowchart illustrating an automatic sensor-calibration method according to the second embodiment of the present invention.

In the automatic sensor-calibration method according to the second embodiment of the present invention, operations S602 through S618 are the same as operations S502 through S518 of the automatic sensor-calibration method according to the first embodiment of the present invention. If any medium such as money remains, the sensor control unit notifies an operator of the existence of the medium in operation S630 such that the operator can remove the remaining medium.

However, the sensor control unit (320 of FIG. 4) loads, from a memory such as ROM, a stored digital value of a previous sensor signal, a currently set current level of the light emitting device, a maximum digital value for a sensor signal of the light receiving device, a slice level change reference value, an absolute slice level, and a minimum slice level in operation S608.

When a slice level calculated based on a digital value of a sensor signal measured by the sensor input unit (310 of FIG. 4) is lower than the preset minimum slice level in operation S616, the current level of the light emitting device is reduced to a minimum step among electric-current steps being set in the current level database (330 of FIG. 4) in operation S620. After the reduction to the minimum step, a sensor signal is newly measured according to the reduced current level of the light emitting device and is then converted into a digital value in order to calculate a new slice level based on the digital value of the sensor signal newly measured by the sensor input unit in operation S622.

The new slice level calculated based on the digital value of the sensor signal newly measured by the sensor input unit is compared with the absolute slice level in operation S624, such that the current level of the light emitting device is increased stepwise in operation S626 until the slice level calculated based on the digital value of the sensor signal newly measured by the sensor input unit is lower than the absolute slice level.

During the process of stepwise increasing the current level of the light emitting device, when the calculated slice level is lower than the absolute slice level, the current slice level is changed to the calculated slice level in operation S628. The digital value of the sensor signal newly measured by the sensor input unit 310 is stored in a memory in operation S618 in order to be compared with a new digital value of a sensor signal newly measured by the sensor input unit when the sensor enters the initialization mode later.

Third Embodiment

Automatic sensor-calibration method to automatically calibrate slice level used as criterion for light receiving device to determine whether medium exists and increase current level of light emitting device stepwise when brightness of light emitting device is lower than reference level, thereby preventing malfunction of sensor.

FIG. 5 is a block diagram of an automatic sensor-calibration apparatus according to a third embodiment of the present invention.

As illustrated in FIG. 5, the automatic sensor-calibration apparatus includes the sensor input unit 310, the sensor control unit 320, the current level database 330, and an abnormal state processing unit 340.

The sensor input unit 310 and the sensor control unit 320 according to the current embodiment of the present invention are the same as the sensor input unit 310 and the sensor control unit 320 according to the first embodiment of the present invention, and the current level database 330 according to the current embodiment of the present invention is the same as the current level database 330 according to the second embodiment of the present invention.

However, the sensor control unit 320 according to the current embodiment of the present invention has an additional function of increasing a current level of the light emitting device by using the current level database 330.

When the value of a sensor signal measured by the sensor input unit 310 exceeds a preset absolute slice level or a slice level calculated based on the digital value of the sensor signal measured by the sensor input unit 310 reaches the absolute slice level, the current level of the light emitting device is increased by one step according to electric-current steps being set in the current level database 330 without increasing the slice level.

For example, as illustrated in FIG. 11, it is assumed that a maximum digital value for a sensor signal of the light receiving device is 1023, an absolute slice level is 800, a stored digital value of a previous sensor signal is 300, and a digital value of a sensor signal measured by the sensor input unit is 750. In this case, the slice level should be set to 841 or higher because the digital value of the sensor signal measured by the sensor input unit is greater than the stored digital value of the previous sensor signal. However, since the absolute slice level is 800, the current level of the light emitting device is increased by one step without increasing the slice level any more. In other words, when the current level of the light emitting device is the first step DA0, i.e., 8.8 mA, it is increased to the second step DA1, i.e., 11.6 mA.

When the current level of the light emitting device is changed, a sensor signal is newly measured according to the changed current level and is then converted into a digital value, after which a slice level is calculated based on a digital value of the sensor signal newly measured by the sensor input unit. Next, the slice level calculated based on the digital value of the sensor signal newly measured by the sensor input unit is compared with the absolute slice level, such that the current level of the light emitting device is increased stepwise until the calculated slice level is lower than the absolute slice level.

During the process of stepwise increasing the current level of the light emitting device, when the slice level calculated based on the digital value of the sensor signal newly measured by the sensor input unit 310 is lower than the absolute slice level, the current slice level is changed to the calculated slice level. The digital value of the sensor signal newly measured by the sensor input unit 310 is stored in a memory in order to be compared with a new digital value of a sensor signal newly measured by the sensor input unit 310 when the sensor enters the initialization mode later.

When an abnormal state, e.g., sharp contamination, occurs, the abnormal state processing unit 340 alarms the abnormal state. For example, the abnormal state processing unit 340 switches on and off an alarm warning light to allow an operator of an ATM to recognize the abnormal state and to deal with the abnormal state, for example, by removing dust on the light emitting device or replacing the sensor.

FIG. 8 is a flowchart illustrating an automatic sensor-calibration method according to the third embodiment of the present invention.

In the automatic sensor-calibration method according to the third embodiment of the present invention, operations S702 through S718 are the same as operations S502 through S518 of the automatic sensor-calibration method according to the first embodiment of the present invention.

However, the sensor control unit (320 of FIG. 5) loads, from a memory such as ROM, a stored digital value of a previous sensor signal, a currently set current level of the light emitting device, an absolute slice level, a maximum digital value for a sensor signal of the light receiving device, and a slice level change reference value in operation S708.

When the value of a sensor signal measured by the sensor input unit (310 of FIG. 5) is higher than the preset absolute slice level or a slice level calculated based on the digital value of the sensor signal measured by the sensor input unit reaches the absolute slice level in operation S716, the current level of the light emitting device is increased by one step without increasing the slice level in operation S722.

For example, it is assumed that the maximum digital value for a sensor signal of the light receiving device is 1023, the absolute slice level is 800, the stored digital value of the previous sensor signal is 300, and the digital value of the sensor signal measured by the sensor input unit is 750. In this case, the slice level may be set to 841 or higher because the digital value of the sensor signal measured by the sensor input unit is greater than the stored digital value of the previous sensor signal. However, since the absolute slice level is 800, the current level of the light emitting device is increased by one step without increasing the slice level any more. In other words, when the current level of the light emitting device is the first step DA0, i.e., 8.8 mA, it is increased to the second step DA1, i.e., 11.6 mA.

When the current level of the light emitting device is changed, a sensor signal is newly measured according to the changed current level and is then converted into a digital value, after which a slice level is calculated based on a digital value of the sensor signal newly measured by the sensor input unit in operation S724. Next, the slice level calculated based on the digital value of the sensor signal newly measured by the sensor input unit is compared with the absolute slice level in operation S726, such that the current level of the light emitting device is increased stepwise until the calculated slice level is lower than the absolute slice level in operation S722.

When the slice level calculated based on the digital value of the sensor signal newly measured by the sensor input unit is lower than the absolute slice level in operation S726 after stepwise increase of the current level of the light emitting device, the current slice level is changed according to the calculated slice level in operation S728. The digital value of the sensor signal newly measured by the sensor input unit is stored in a memory in operation S718 in order to be compared with a new digital value of a sensor signal measured by the sensor input unit when the sensor enters the initialization mode later.

However, when the current level of the light emitting device exceeds the preset steps in operation S720, an alarm is generated by the abnormal state processing unit (340 of FIG. 5) in operation S730 to allow the operator of the ATM to deal with such an abnormal state, for example, by removing dust on the light emitting device or replacing the sensor.

In the automatic sensor-calibration method according to the present invention, a state change of a sensor, caused by aging characteristics or contamination of the sensor, is self-sensed by a sensor input unit. Thus, a slice level, which is used as a criterion for a light receiving device to determine whether a medium exists, is adjusted according to the sensed state change of the sensor. In addition, the slice level is adjusted according to the sensed state change of the sensor and at the same time, a current level of the light emitting device is increased stepwise, thereby preventing malfunction of the sensor.

Moreover, in the automatic sensor-calibration method according to the present invention, when contamination of the sensor is removed, the current level of the light emitting device is reduced to a minimum step, the slice level is set, and then the current level of the light emitting device is adjusted again based on the set slice level, thereby preventing malfunction of the sensor.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. An automatic sensor-calibration method for an automatic sensor-calibration apparatus comprising a sensor input unit, a current level database, and a sensor control unit, the automatic sensor-calibration method comprising:

upon entry to an initialization mode after booting, measuring a sensor signal by a sensor input unit and converting the measured sensor signal into a digital value;

loading a stored digital value of a previous sensor signal, a currently set maximum digital value for a sensor signal of a light receiving device, a current level of a light emitting device, a minimum slice level, and an absolute slice level;

comparing the loaded digital value of the previous sensor signal with the digital value of the sensor signal measured by the sensor input unit, calculating a new slice level if a difference between the loaded digital value of the previous sensor signal and the digital value of the sensor signal measured by the sensor input unit is greater than a preset value, and changing a current slice level to the calculated new slice level;

characterized in that, if the changed slice level is lower than the minimum slice level, the method comprises, reducing the current level of the light emitting device to a minimum current level in a series of predetermined current levels for the light emitting device step;

newly measuring a sensor signal by the sensor input unit, converting the measured sensor signal into a digital value, calculating a new slice level based on the digital value of the newly measured sensor signal, comparing the calculated new slice level with the absolute slice level, increasing the current level of the light emitting device stepwise in fixed increments until the new slice level calculated based on the digital value of the newly measured sensor signal is lower than the absolute slice level, and changing a current slice level to the new slice level calculated based on the digital value of the newly measured sensor signal when the new slice level is lower than the absolute slice level.

2. The method of claim 1, wherein the measuring of the sensor signal and the converting of the measured sensor signal comprises determining whether a medium exists in the sensor input unit and measuring the sensor signal when the medium does not exist in the sensor input unit.

3. The method of claim 1, wherein the calculating of the new slice level and the changing of the current slice level to the calculated new slice level comprises calculating the new slice level by increasing the digital value of the sensor signal measured by the sensor input unit by ⅓ of a difference between the digital value of the sensor signal measured by the sensor input unit and the maximum digital value for the sensor signal of the light receiving device.

4. The method of claim 1, wherein the increasing of the current level of the light emitting device comprises increasing the current level of the light emitting device stepwise according to steps being set in the current level database.

5. The method of claim 1, further comprising storing the digital value of the sensor signal measured by the sensor input unit in a memory if the current slice level is changed.

6. An automatic sensor-calibration method for an automatic sensor-calibration apparatus comprising a sensor input unit, an abnormal state processing unit, a current level database, and a sensor control unit, the automatic sensor-calibration method comprising:

upon entry to an initialization mode after booting, measuring a sensor signal by a sensor input unit and converting the measured sensor signal into a digital value;

loading a stored digital value of a previous sensor signal, a currently set maximum digital value for a sensor signal of a light receiving device, a current level of a light emitting device, and an absolute slice level;

comparing the loaded digital value of the previous sensor signal with the digital value of the sensor signal measured by the sensor input unit, calculating a new slice level if a difference between the loaded digital value of the previous sensor signal and the digital value of the sensor signal measured by the sensor input unit is greater than a preset value, and changing a current slice level to the calculated new slice level;

characterized in that, if the changed slice level is the same as or greater than the absolute slice level, the method comprises, increasing the current level of the light emitting device stepwise in fixed increments;

newly measuring a sensor signal by the sensor input unit, converting the measured sensor signal into a digital value, calculating a new slice level based on the digital value of the newly measured sensor signal, comparing the calculated new slice level with the absolute slice level, increasing the current level of the light emitting device stepwise in fixed increments until the new slice level calculated based on the digital value of the newly measured sensor signal is lower than the absolute slice level; and changing a current slice level to the new slice level calculated based on the digital value of the newly measured sensor signal when the new slice level is lower than the absolute slice level.

7. The method of claim 6, wherein the measuring of the sensor signal and the converting of the measured sensor signal comprises determining whether a medium exists in the sensor input unit and measuring the sensor signal when the medium does not exist in the sensor input unit.

8. The method of claim 6, wherein the calculating of the new slice level and the changing of the current slice level to the calculated new slice level comprises calculating the new slice level by increasing the digital value of the sensor signal measured by the sensor input unit by ⅓ of a difference between the digital value of the sensor signal measured by the sensor input unit and the maximum digital value for the sensor signal of the light receiving device.

9. The method of claim 6, wherein the increasing of the current level of the light emitting device comprises increasing the current level of the light emitting device stepwise according to steps being set in the current level database.

10. The method of claim 6 or 9, wherein the increasing of the current level of the light emitting device comprises generating an alarm by the abnormal state processing unit when the current level of the light emitting device exceeds the steps being set in the current level database.

11. The method of claim 6, further comprising storing the digital value of the sensor signal measured by the sensor input unit in a memory if the current slice level is changed.

* * * * *